US010230224B2

(12) United States Patent
Inoue et al.

(10) Patent No.: US 10,230,224 B2
(45) Date of Patent: Mar. 12, 2019

(54) ELECTRICAL WIRE GUIDE APPARATUS

(71) Applicant: Sumitomo Wiring Systems, Ltd., Yokkaichi, Mie (JP)

(72) Inventors: Hiroshi Inoue, Mie (JP); Tetsushi Enomoto, Mie (JP)

(73) Assignee: Sumitomo Wiring Systems, Ltd., Yokkaichi, Mie (JP)

( * ) Notice: Subject to any disclaimer, the term of this patent is extended or adjusted under 35 U.S.C. 154(b) by 0 days.

(21) Appl. No.: 15/724,911

(22) Filed: Oct. 4, 2017

(65) Prior Publication Data

US 2018/0097345 A1    Apr. 5, 2018

(30) Foreign Application Priority Data

Oct. 5, 2016 (JP) ................................. 2016-197029

(51) Int. Cl.
*H02G 3/04* (2006.01)
*H02G 11/00* (2006.01)
*B60R 16/027* (2006.01)

(52) U.S. Cl.
CPC ......... *H02G 3/0462* (2013.01); *B60R 16/027* (2013.01); *H02G 3/0475* (2013.01); *H02G 11/00* (2013.01)

(58) Field of Classification Search
CPC .... H02G 3/0462; H02G 3/0475; H02G 11/00; B60R 16/02

USPC ........................................................ 174/68.3
See application file for complete search history.

(56) References Cited

U.S. PATENT DOCUMENTS

| 7,462,779 | B2 * | 12/2008 | Caveney | H01R 9/2416 |
| | | | | 174/47 |
| 7,654,891 | B2 * | 2/2010 | Enomoto | G07D 9/008 |
| | | | | 453/49 |
| 7,910,832 | B2 * | 3/2011 | Pieh | B60R 16/0215 |
| | | | | 174/99 R |
| 9,431,802 | B2 * | 8/2016 | Anselmo | H02G 3/0437 |

FOREIGN PATENT DOCUMENTS

JP    2015101131 A    6/2015

* cited by examiner

*Primary Examiner* — Dhiru R Patel
(74) *Attorney, Agent, or Firm* — Reising Ethington, P.C.

(57) ABSTRACT

An electrical wire guiding apparatus that can define the inclination angle of a rotating end. The electrical wire guiding apparatus includes: a bracket that is to be fixed to a mounting portion, a rotating end that is arranged at an end portion of an electrical wire guide and is held in the bracket in a manner of being able to rotate in any direction, the electrical wire guide surrounding electrical wires and being able to bend in a predetermined shape; and angle restriction edges that are provided on the bracket and the rotating end and restrict the angle of the rotating end by abutting against opposing members when the rotating end becomes inclined at a predetermined angle.

3 Claims, 15 Drawing Sheets

US 10,230,224 B2

ELECTRICAL WIRE GUIDE APPARATUS

CROSS REFERENCE TO RELATED APPLICATIONS

This application claims the priority of Japanese patent application JP2016-197029 filed on Oct. 5, 2016, the entire contents of which are incorporated herein.

TECHNICAL FIELD

The present invention relates to an electrical wire guiding apparatus.

BACKGROUND ART

Conventionally, an electrical wire guiding apparatus is known that guides the movement of a wire harness that repeatedly undergoes a predetermined bending movement, such as a wire harness that supplies power to an electrical component installed in a sliding door of a vehicle, for example. For example, an electrical wire guiding apparatus disclosed in Patent Document 1 (JP2015-101131A) includes an electrical wire guide that surrounds electrical wires and has a structure capable of bending in a predetermined shape, and a bracket that holds an end portion of the electrical wire guide and is fixed to a sliding door. The end portion of the electrical wire guide and the bracket have a spherical surface contact structure, and the end portion of the electrical wire guide can rotate in any direction.

SUMMARY

However, with the configuration described above, there is a problem in that the inclination angle of the end portion (rotating end) of the electrical wire guide is not defined. In other words, the rotating end slides due to gravity, reaction force from the electrical wire, and the like, and therefore there has been a problem in that the inclination angle of the rotating end varies greatly, and management of the angle is difficult.

The present design was achieved in light of the foregoing situation, and an object thereof is to provide an electrical wire guiding apparatus that can define the inclination angle of the rotating end.

An electrical wire guiding apparatus according to one aspect of the present design includes: a bracket that is to be fixed to a mounting portion; a rotating end that is arranged at an end portion of an electrical wire guide and is held in the bracket in a manner of being able to rotate in any direction, the electrical wire guide surrounding an electrical wire and being able to bend in a predetermined shape; and an angle restriction edge that is provided on the bracket or the rotating end and restricts an angle of the rotating end by abutting against an opposing member when the rotating end becomes inclined at a predetermined angle.

According to the present design, sliding of the rotating end is restricted, thus making it possible to define the inclination angle of the rotating end.

DESCRIPTION OF EMBODIMENTS

The following are preferred aspects of the present design.

In the electrical wire guiding apparatus according to an aspect of the present design, the angle restriction edge may abut against an opposing member on at least upper and lower sides of the rotating end when the rotating end becomes inclined at the predetermined angle. According to this configuration, the inclination angle of the rotating end can be more reliably defined.

Also, in the electrical wire guiding apparatus according to an aspect of the present design, the opposing member may be shaped as a groove. According to this configuration, a groove-shaped edge engages with the angle restriction edge, thus making it possible to more reliably define the inclination angle of the rotating end.

Embodiment

An embodiment will be described in detail below with reference to FIGS. 1 to 15.

Figure 2:
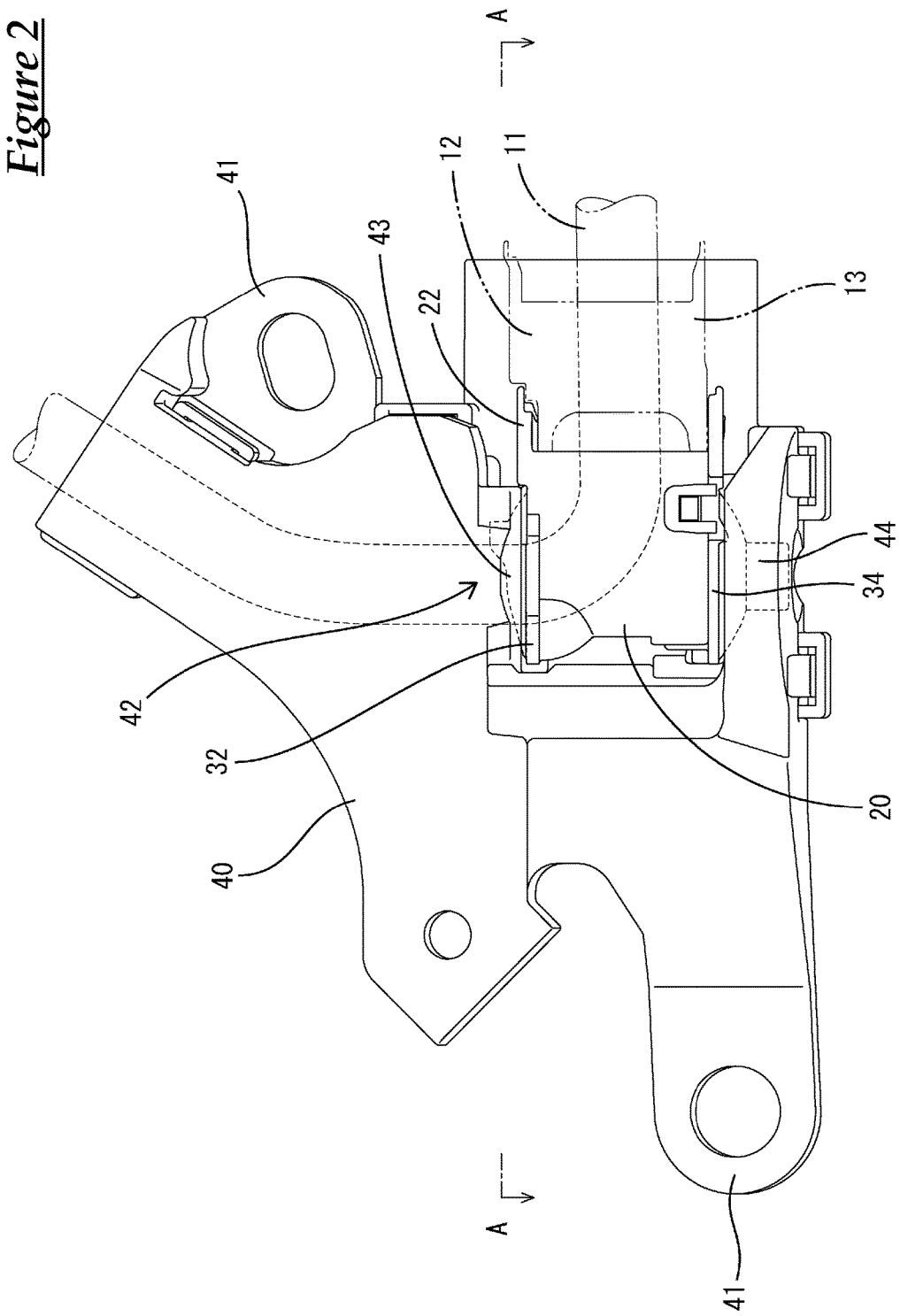
FIG. 2 is a front view of a bracket in a state in which a rotating end is being held.
Figure 3:
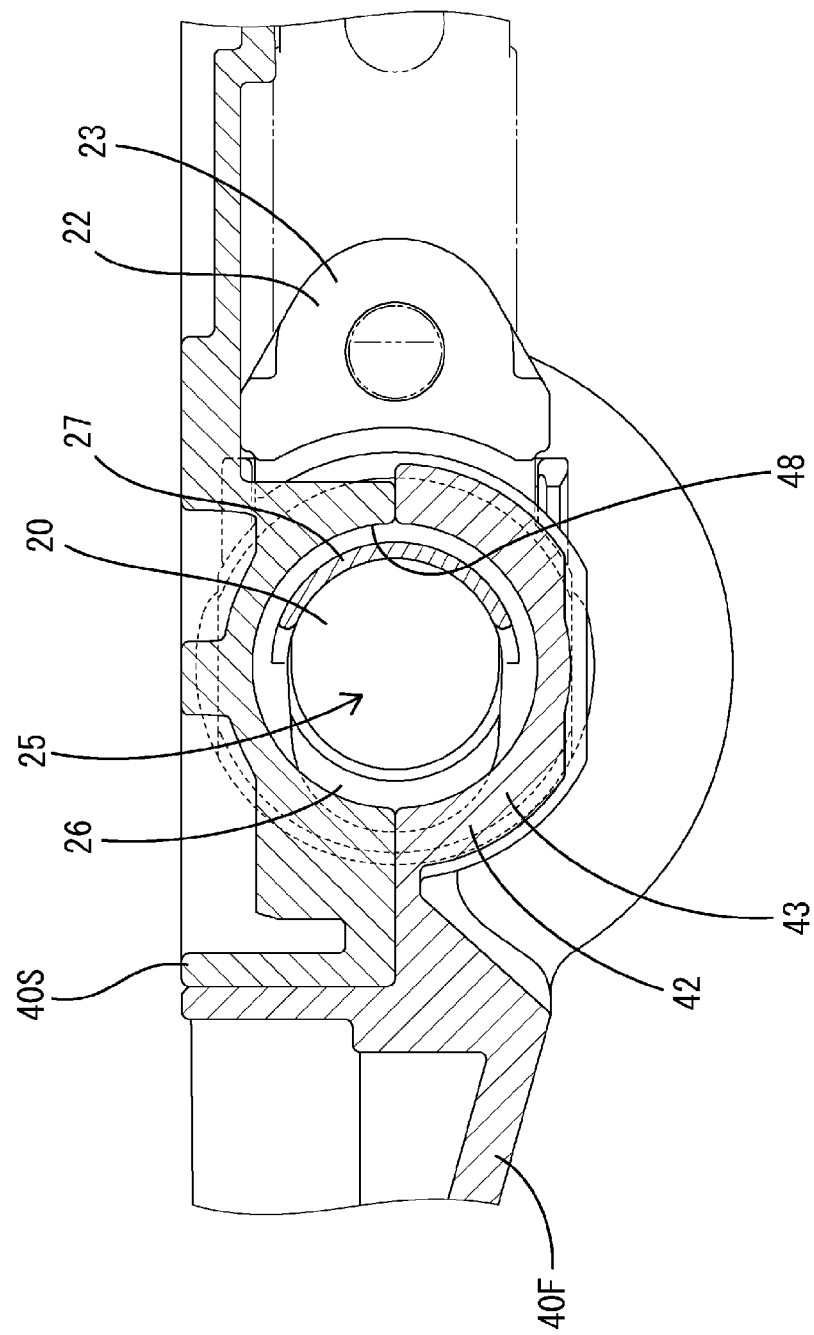
FIG. 3 is a partially enlarged cross-sectional view of the state in which the rotating end is being held, and corresponds to a cross-section taken along A-A in FIG. 2.

An electrical wire guiding apparatus of the present embodiment is for attachment to a vehicle that has a sliding door D, and guides the bending movement of a sliding door wire harness 10 for continuously supplying power to an electrical component (not shown) installed in the sliding door D. The sliding door D is displaced in a diagonally upward direction when moving from a fully-closed state of being completely closed to a fully-open state of being completely open (i.e., when sliding in a vehicle rearward direction). The wire harness 10 has a plurality of electrical wires 11 and is provided so as to span between a vehicle body B and the sliding door D. In the following description of constituent members, the upward side in FIG. 2 (the upper side in the state where the wire harness 10 is attached to a vehicle) is considered to be the upper side, and the downward side in FIG. 2 is considered to be the lower side.

Figure 1:
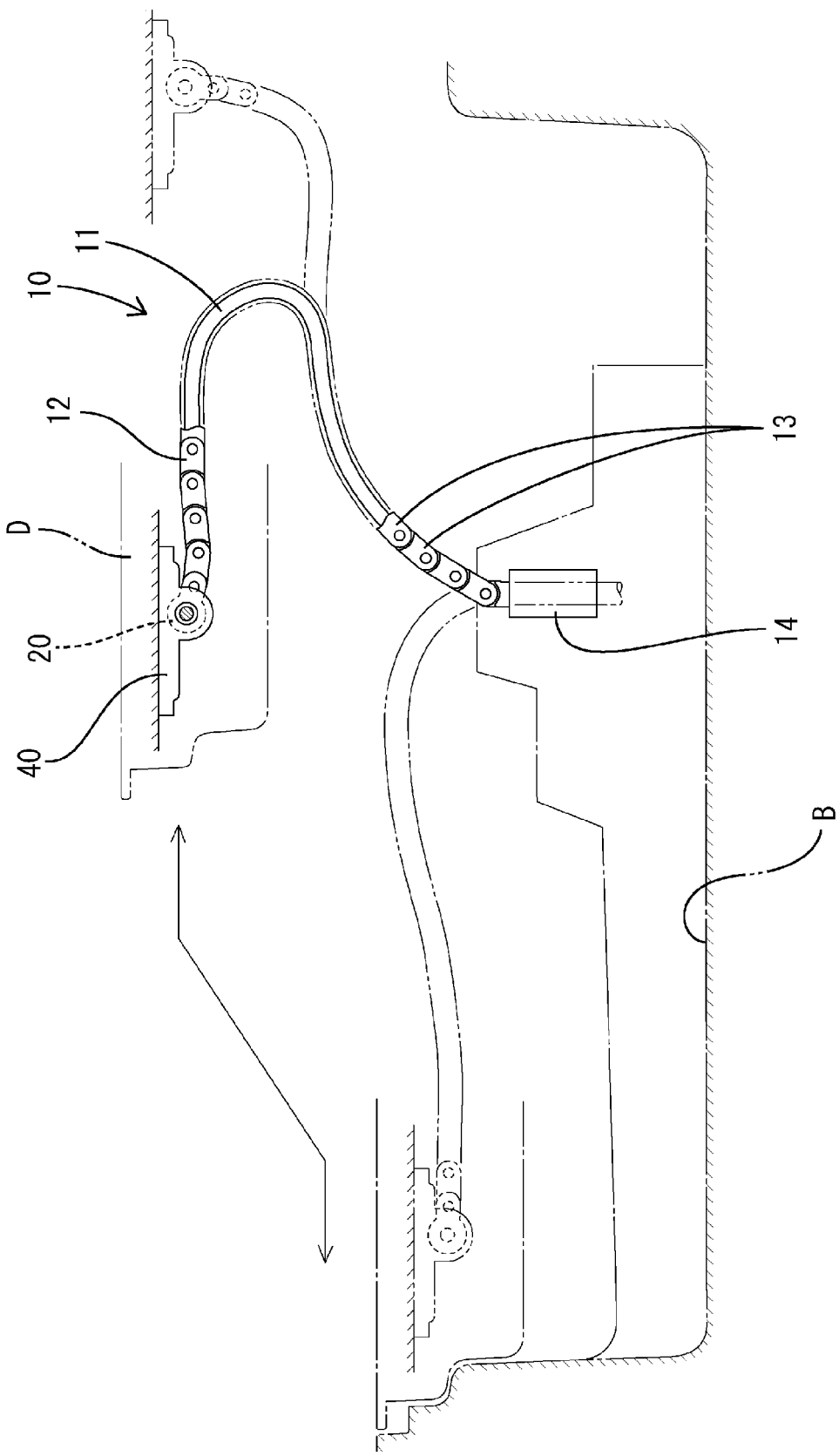
FIG. 1 is a schematic plan view of an electrical wire guiding apparatus according to an embodiment, and shows bending displacement of an electrical wire guide in accordance with the opening/closing of a sliding door.

The electrical wire guiding apparatus includes an electrical wire guide 12 that surrounds the electrical wires 11 and can bend in a predetermined shape with respect to an approximately horizontal plane. As shown in FIG. 1, the electrical wire guide 12 includes a plurality of link bodies 13 that are approximately shaped as rectangular tubes and are connected in a pivotable manner. An end portion of the electrical wire guide 12 on the body B side is connected to a body-side bracket 14 in a non-pivotable manner, and an end portion on the sliding door D side (referred to hereinafter as a rotating end 20) is connected to a door-side bracket (referred to hereinafter as simply a bracket 40) in a pivotable manner. When the sliding door D is in the fully-closed state and the fully-open state, the lower side of the electrical wire guide 12 is supported by the vehicle body B, and when the sliding door D is in a semi-open state that is between the fully-closed state and the fully-open state, the electrical wire guide 12 is in a free-floating state. Note that the electrical wire guide 12 is protected by a rubber protective tube (not shown) that is flexible.

Figure 4:
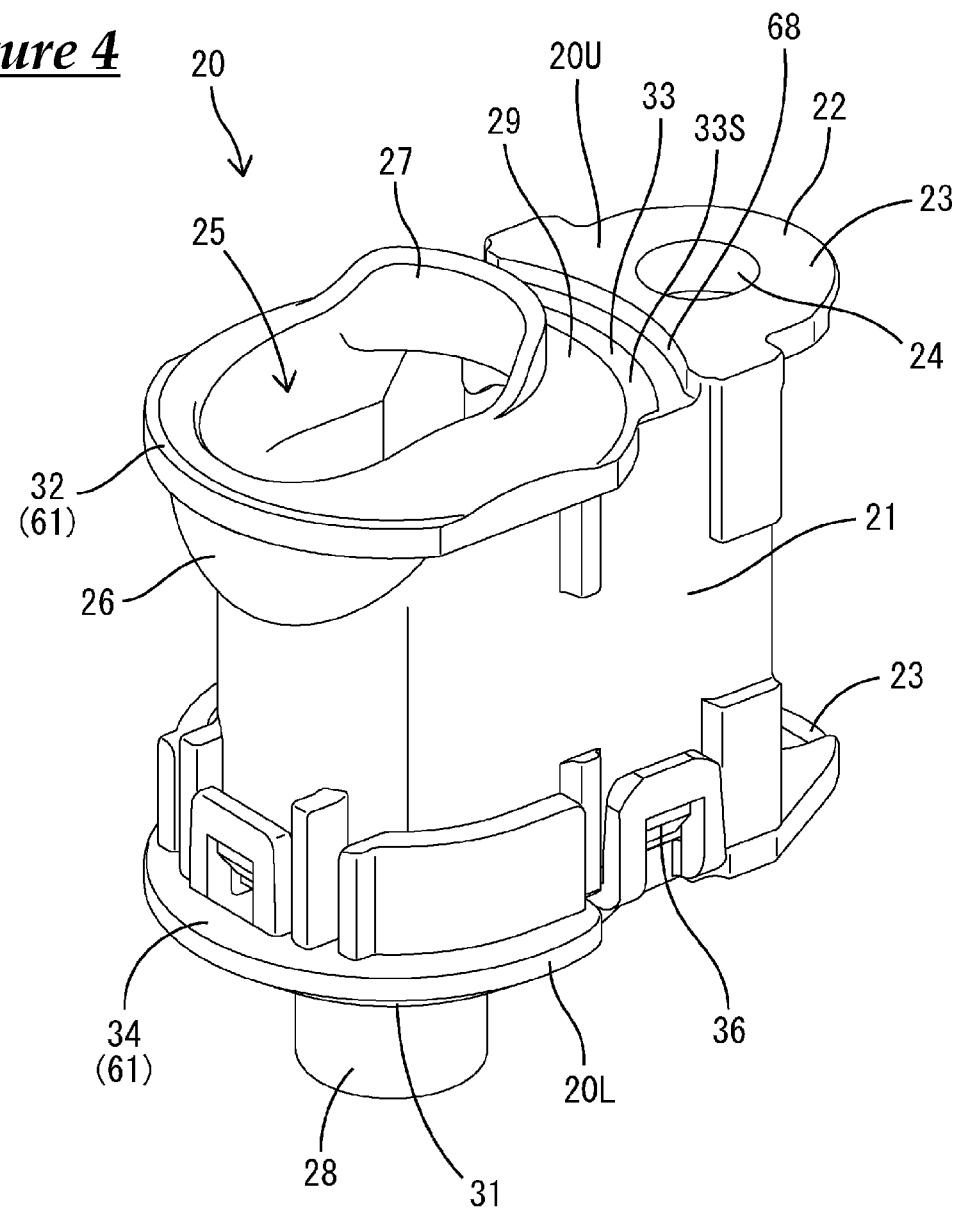
FIG. 4 is a perspective view of the rotating end.

The rotating end 20 is arranged at an end portion of the electrical wire guide 12, and is held in the bracket 40 in a rotatable manner. As shown in FIG. 4, the rotating end 20 is overall shaped as a hollow block. The rotating end 20 has a tubular portion 21 that surrounds the electrical wires 11 and has an opening in the lengthwise direction of the electrical wire guide 12, and a connection portion 22 for connection to another link body 13 is provided on one end side, in the lengthwise direction, of the tubular portion 21. The connection portion 22 has a pair of connection pieces that are arranged opposing each other in the vertical direction, and each of the connection pieces 23 is provided with a connection hole 24 into which a connection protrusion 15 of the link body 13 can be fitted (see FIG. 13).

Figure 5:
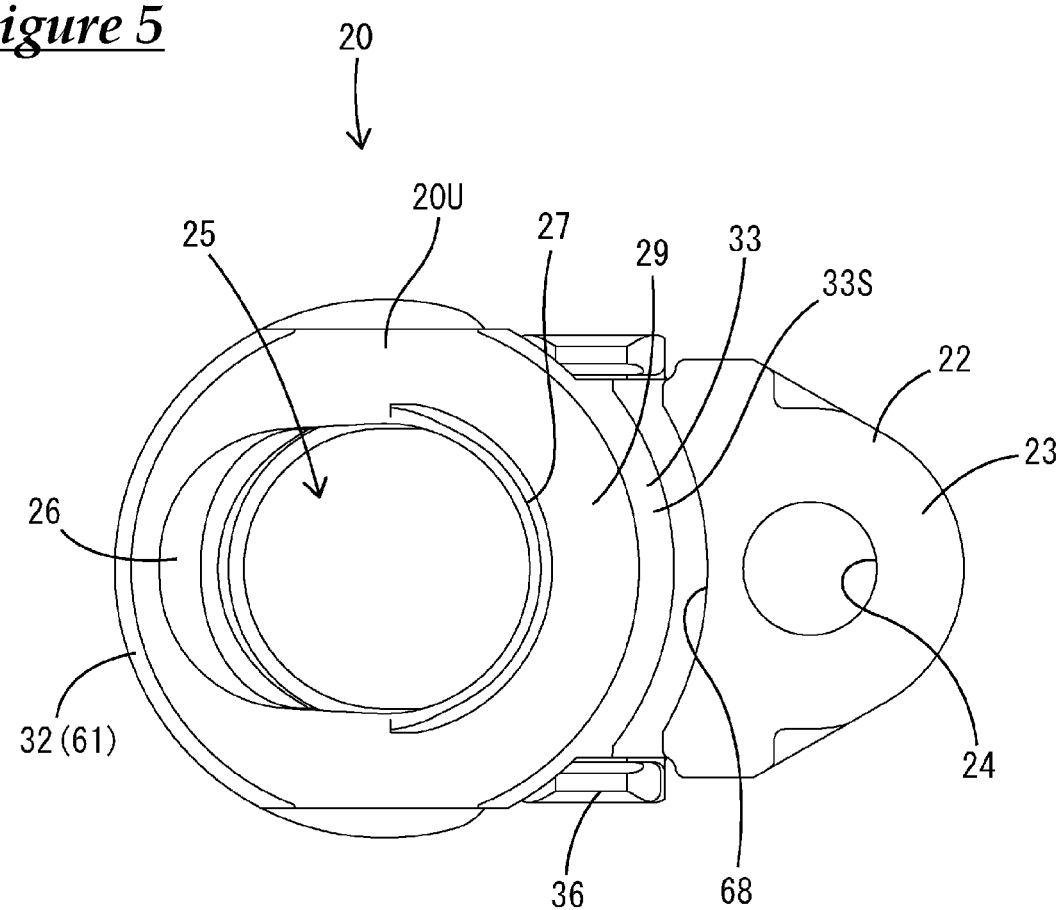
FIG. 5 is a plan view of the rotating end.
Figure 13:
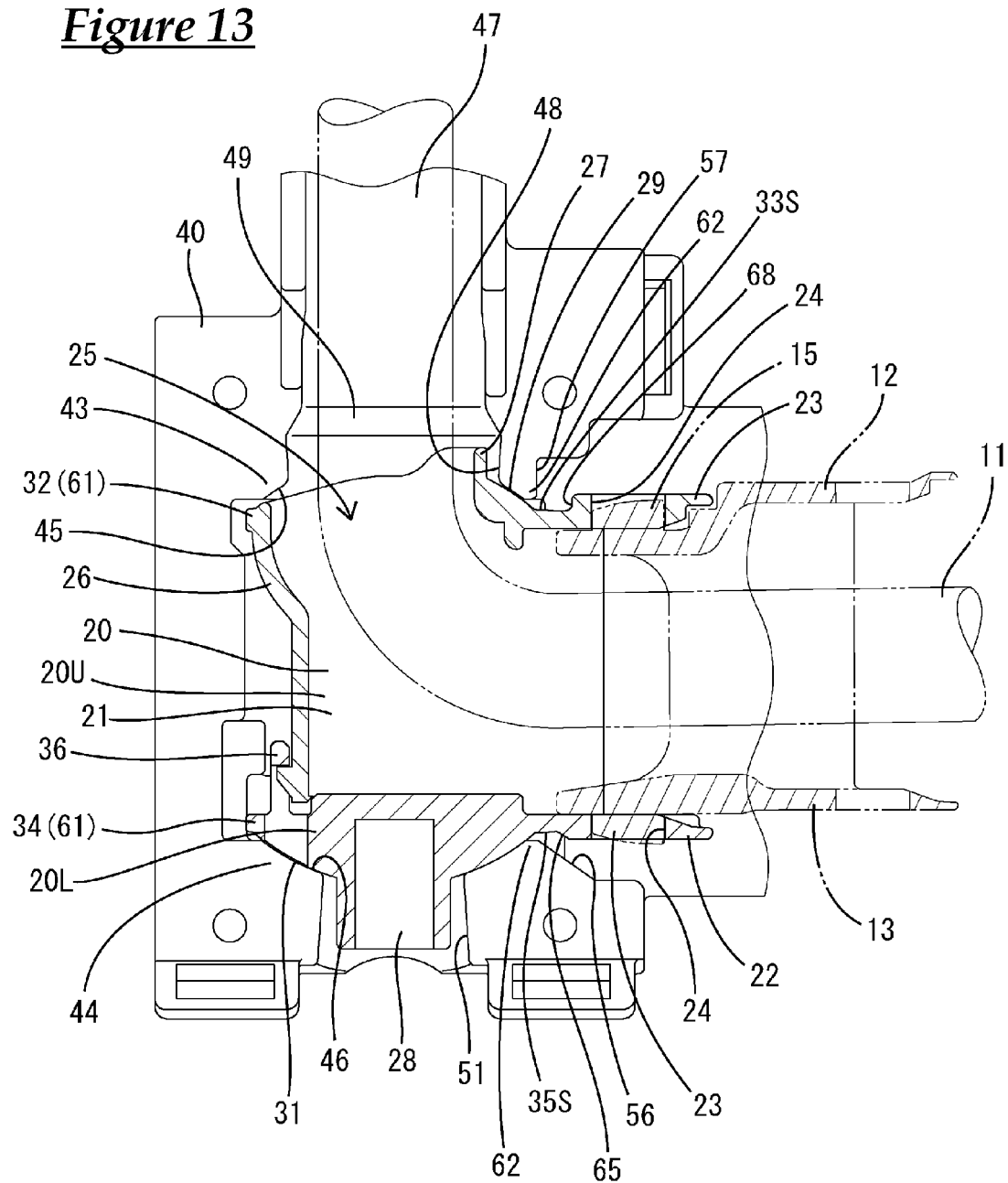
FIG. 13 is a cross-sectional view of the state in which the rotating end is being held by the bracket.

An electrical wire insertion hole 25, which is for drawing out the electrical wires 11 that have been inserted into the rotating end 20 from the inside of the electrical wire guide 12, is formed in the upper surface of the rotating end 20 as shown in FIG. 13. An increasing width portion 26 is formed in the circumferential wall of the electrical wire insertion hole 25 with an inclination (curvature) according to which the width dimension of the electrical wire insertion hole 25 increases away from the connection portion 22 while extending from the inside of the rotating end 20 toward the upper end. The upper end edge of the electrical wire insertion hole 25 is shaped as an ellipse that is elongated in the direction of connection to the electrical wire guide 12 in a plan view as shown in FIG. 5, A restriction wall portion 27, which functions so as to prevent an excessively inclined orientation of the rotating end 20 by abutting against the bracket 40, extends upward from the upper end edge of the rotating end 20. The restriction wall portion 27 rises approximately vertically upward along the upper end edge of the electrical wire insertion hole 25. Also, the restriction wall portion 27 extends in a continuous manner in the shape of a circular arc in only approximately half of the upper end edge of the electrical wire insertion hole 25 on the connection portion 22 side.

A fitting protrusion portion 28, which is capable of fitting into a fitting hole portion 51 of the bracket 40, protrudes downward from the lower surface of the rotating end 20. The fitting protrusion portion 28 has a cylindrical shape, and extends in the vertical direction approximately coaxially with the electrical wire insertion hole 25.

The rotating end 20 is supported to the bracket 40 by a so-called ball joint structure. An upper support surface 29 and a lower support surface 31 that constitute part of the ball joint structure are formed on the upper and lower sides of the rotating end 20. The upper support surface 29 and the lower support surface 31 have a curved surface shape, and respectively slide over an upper receiving surface 45 and a lower receiving surface 46 of the bracket 40. Accordingly, while being held in the bracket 40, the rotating end 20 can pivot in any direction (horizontal direction and vertical direction).

Figure 7:
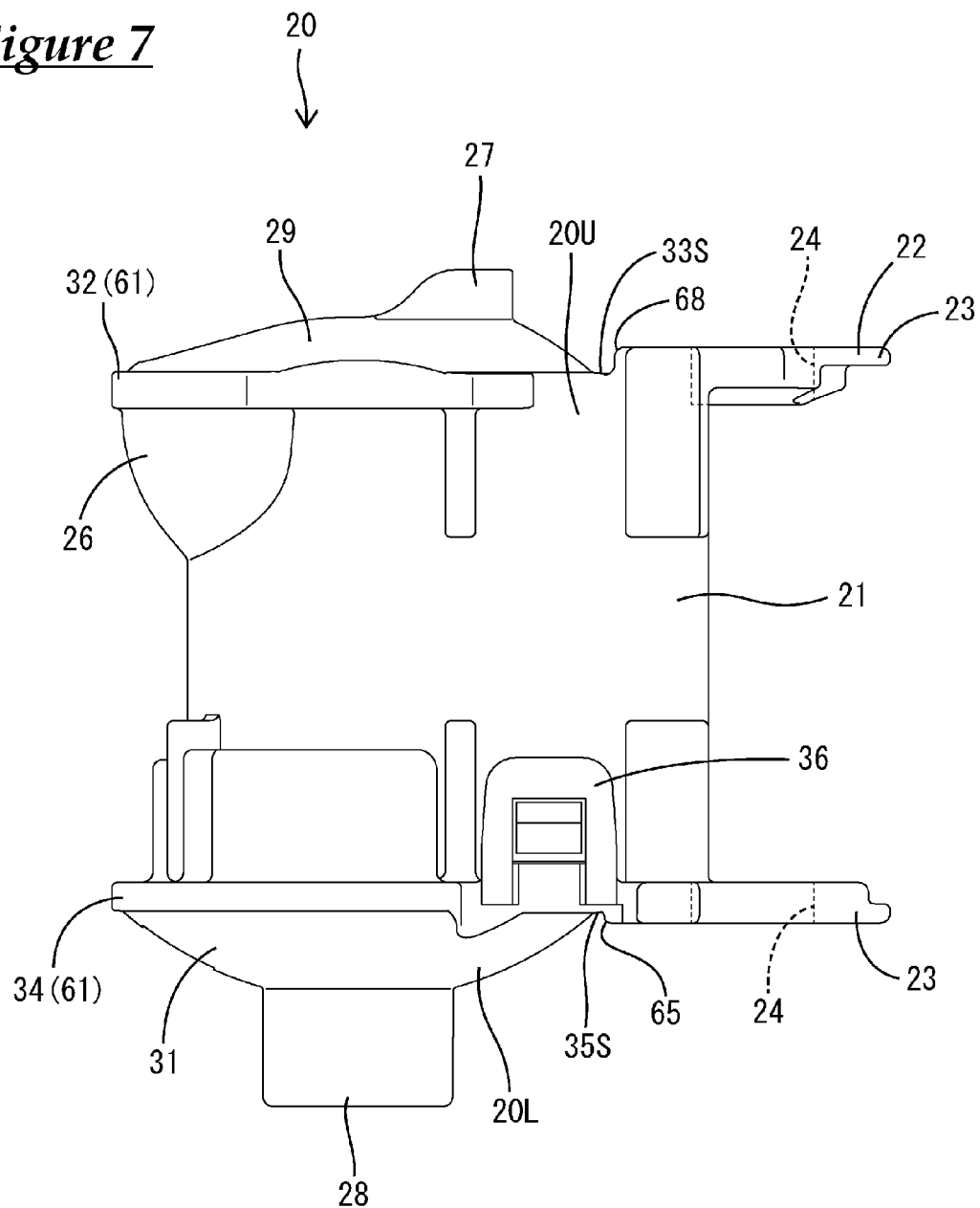
FIG. 7 is a side view of the rotating end.
Figure 8:
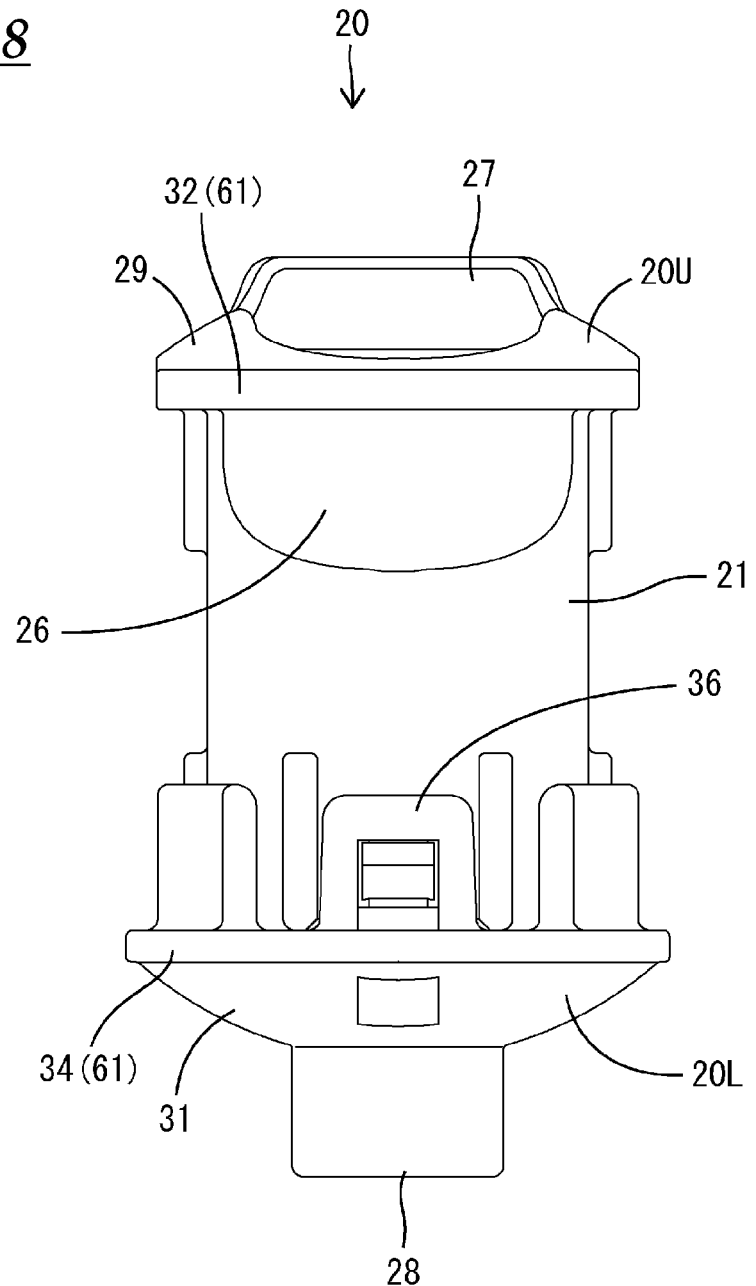
FIG. 8 is a front view of the rotating end.
Figure 9:
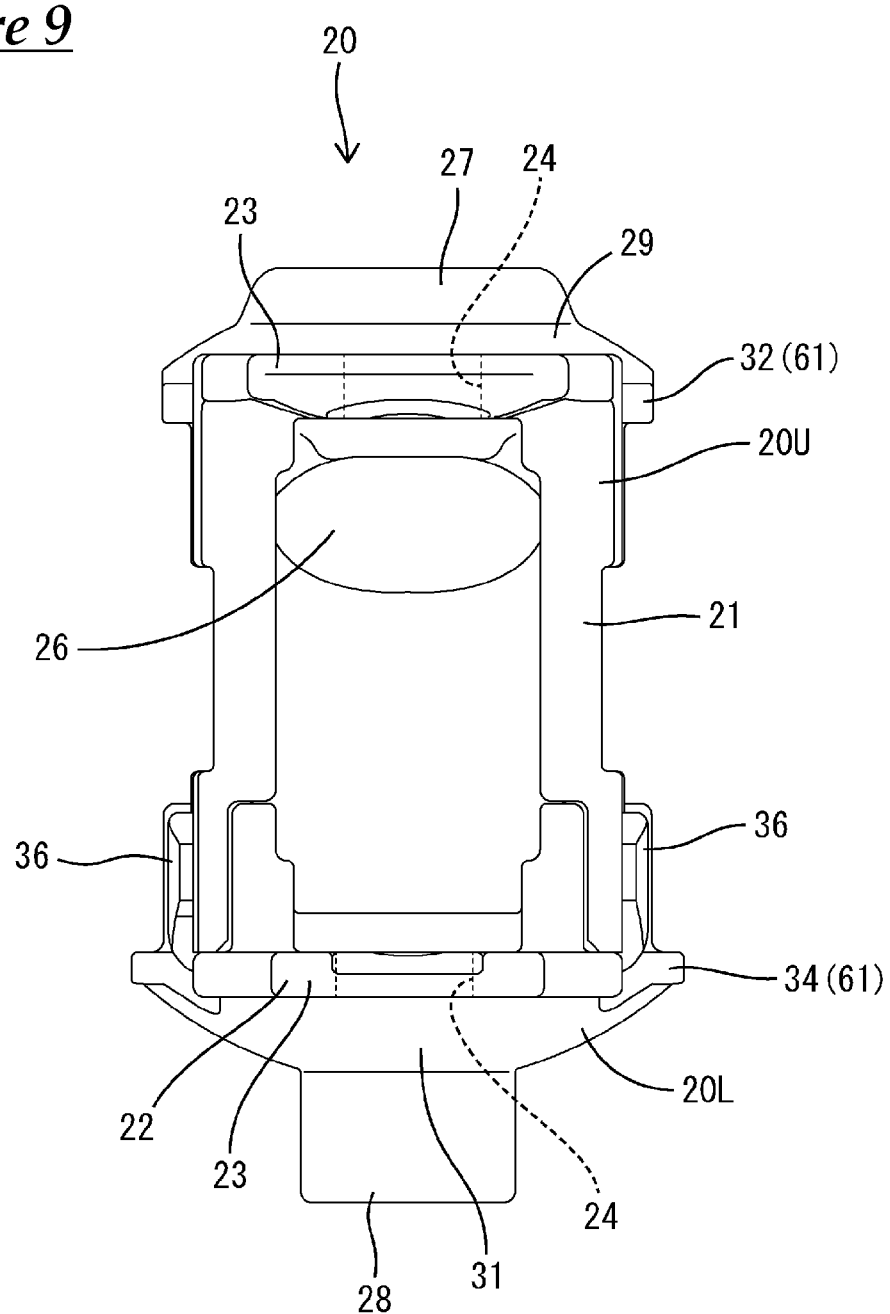
FIG. 9 is a back view of the rotating end.

As shown in FIG. 5, the upper support surface 29 extends in a continuous manner in the circumferential direction while surrounding the entire circumference of the electrical wire insertion hole 25. As shown in FIG. 7, the upper support surface 29 is a curved surface that is smoothly curved such that the diameter dimension gradually increases while extending downward from the upper end edge of the electrical wire insertion hole 25.

Figure 6:
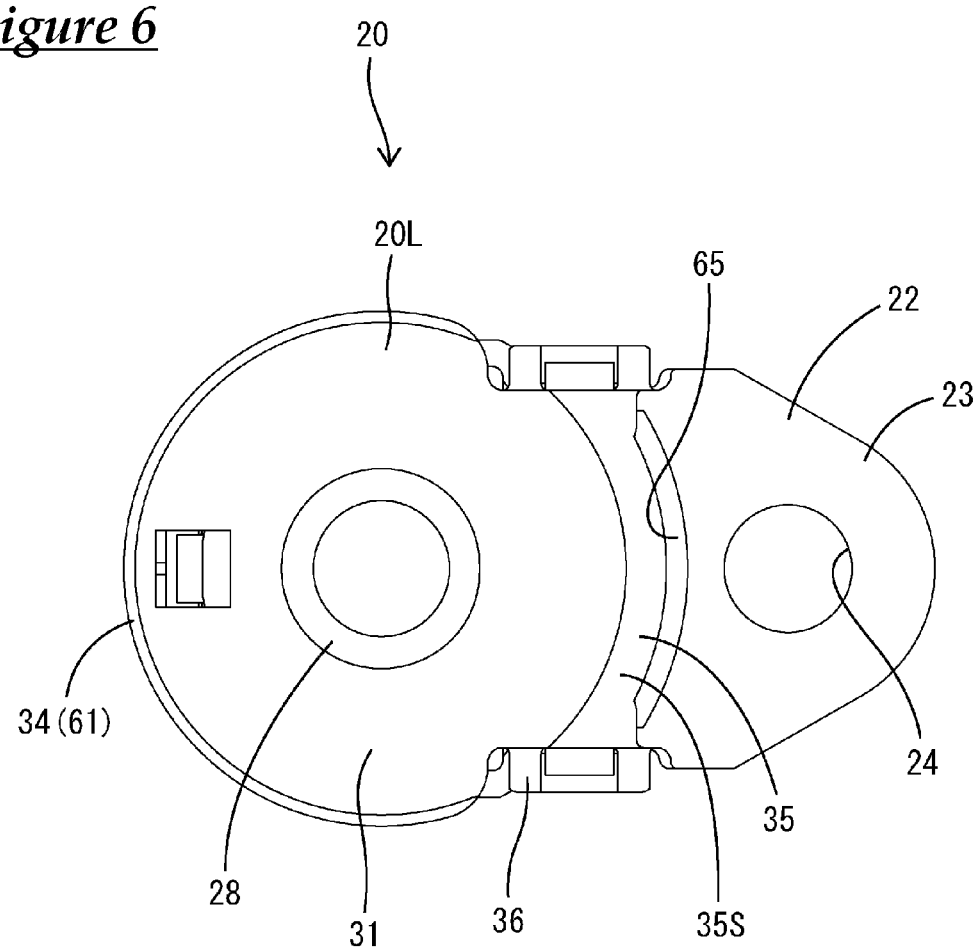
FIG. 6 is a bottom view of the rotating end.

As shown in FIG. 6, the lower support surface 31 extends in a continuous manner in the circumferential direction while surrounding the entire circumference of the fitting protrusion portion 28. The lower support surface 31 has a larger width dimension (dimension in the diameter direction) than the upper support surface 29. As shown in FIG. 7, the lower support surface 31 is a curved surface that is smoothly curved such that the diameter dimension gradually increases while extending upward from the upper end of the fitting protrusion portion 28.

As shown in FIG. 4, an upper flange portion 32 is provided on an upper portion of the rotating end 20. The upper flange portion 32 is provided on the side opposite to the connection portion 22, and protrudes in the vertical direction along the lower end edge of the upper support surface 29.

Figure 10:
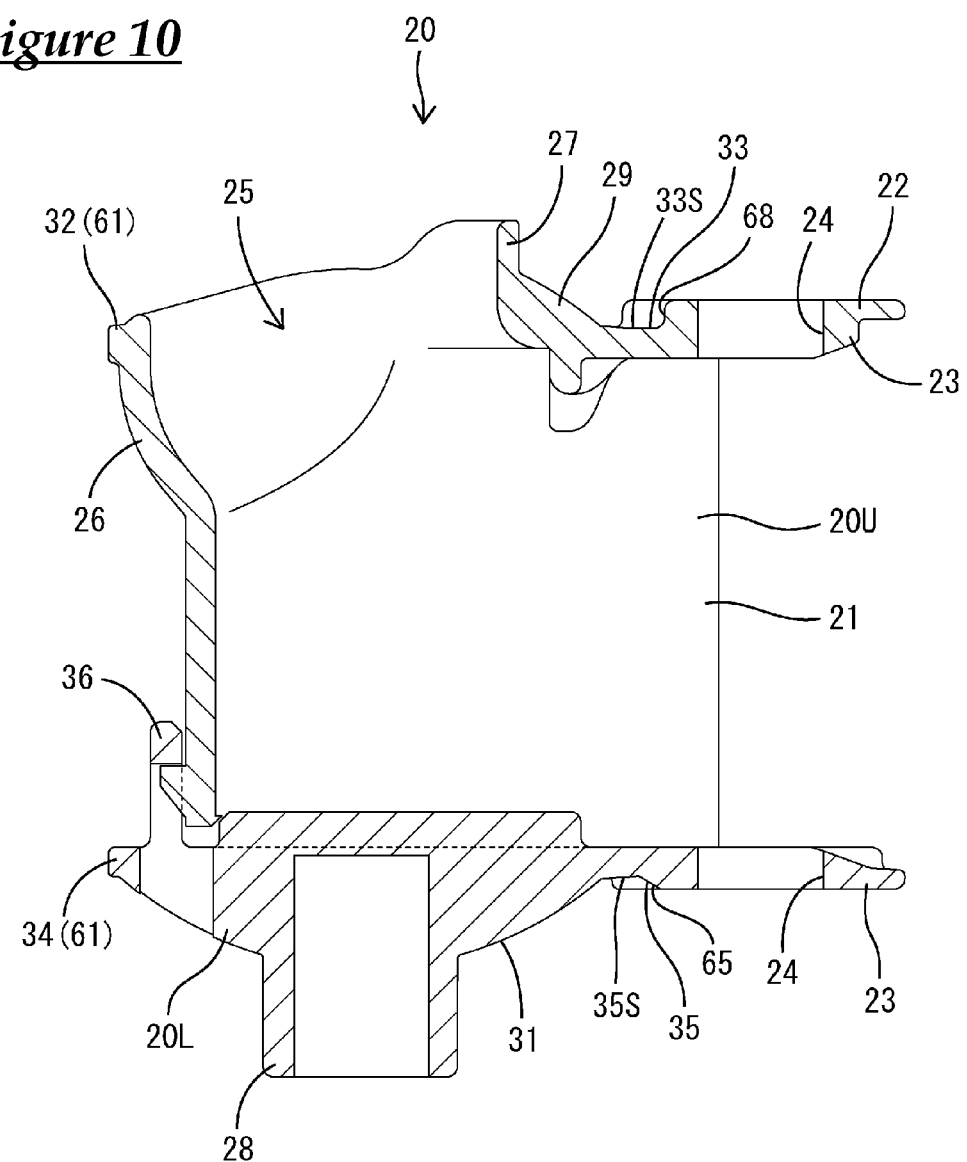
FIG. 10 is a cross-sectional view of the rotating end.
Figure 11:
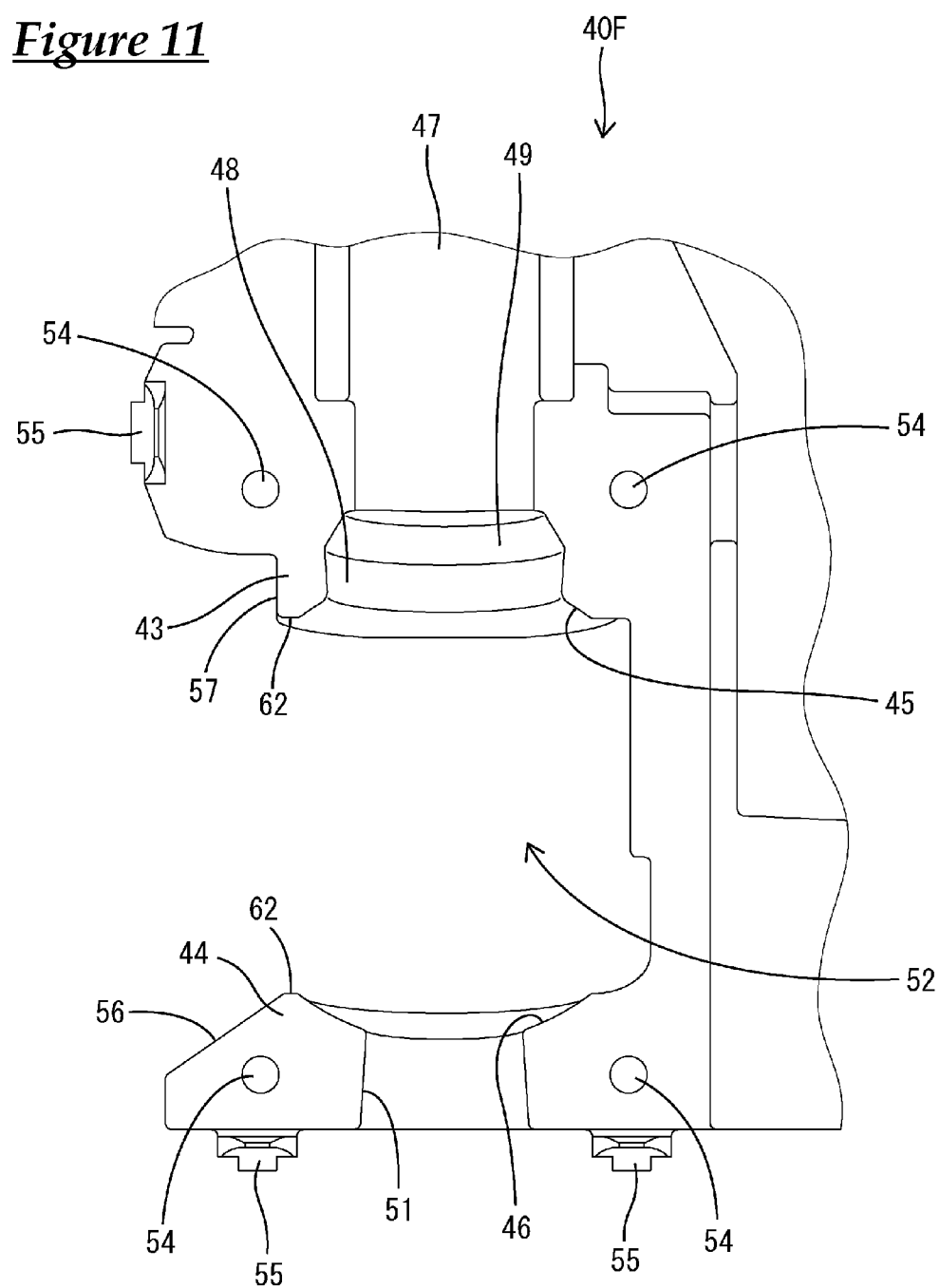
FIG. 11 is a partial cutaway front view of a rotating end holding portion of a first member of the bracket.

Also, an upper groove portion 33 is formed in the upper surface of the rotating end 20. The upper groove portion 33 is provided on the connection portion 22 side, and is recessed downward along the lower end edge of the upper support surface 29. As shown in FIG. 10, the upper groove portion 33 is formed between the upper support surface 29 and one connection piece 23, the lower end edge of the upper support surface 29 is connected to a bottom surface 33S of the upper groove portion 33, and the upper surface of the connection piece 23 is located higher than the bottom surface 33S of the upper groove portion 33. The bottom surface 33S of the upper groove portion 33 is arranged at approximately the same height as the upper surface of the upper flange portion 32.

As shown in FIG. 10, a lower flange portion 34 is provided on a lower portion of the rotating end 20. The lower flange portion 34 is provided on the side opposite to the connection portion 22, and protrudes in the vertical direction along the upper end edge of the lower support surface 31. As shown in FIG. 6, the lower flange portion 34 extends in a continuous manner over a range of half or more of the lower support surface 31.

Also, a lower groove portion 35 is formed in the lower surface of the rotating end 20. The lower groove portion 35 is provided on the connection portion 22 side, and is recessed upward along the upper end edge of the lower support surface 31 as shown in FIG. 10. The lower groove portion 35 is formed between the lower support surface 31 and one connection piece 23, the upper end edge of the lower support surface 31 is connected to a bottom surface 35S of the lower groove portion 35, and the lower surface of the connection piece 23 is located lower than the bottom surface 35S of the lower groove portion 35. The bottom surface 35S of the lower groove portion 35 is arranged at approximately the same height as the lower surface of the lower flange portion 34. Note that approximately the entire circumference of the lower support surface 31 is surrounded by the lower groove portion 35 and the lower flange portion 34.

The upper flange portion 32 and the lower flange portion 34 of the rotating end 20 constitute angle restriction edges that restrict the angle of the rotating end 20. The angle restriction edges will be described in detail later.

As shown in FIG. 10, the rotating end 20 has a semi-divided structure including an upper-side member 20U and a lower-side member 20L that can be combined in the vertical direction. The upper-side member 20U has the electrical wire insertion hole 25 and is overall shaped as a box in which the lower surface side of the tubular portion 21 is open. The lower-side member 20L has the fitting protrusion portion 28, and is overall shaped as a cover plate that blocks the open surface side of the upper-side member 20U. The upper-side member 20U and the lower-side member 20L are held so as to be integrally connected by connection means 36 that are provided at a plurality of locations.

The bracket 40 is fixed to an inner portion of the sliding door (mounting portion) D, and has a plurality of fixing flange portions 41 that are fixed to the sliding door D (see FIG. 2).

The bracket 40 includes a rotating end holding portion 42 that holds the rotating end 20. The rotating end holding portion 42 is provided with an upper holding portion 43 and a lower holding portion 44 that respectively hold the upper and lower portions of the rotating end 20. The upper holding portion 43 and the lower holding portion 44 surround the entire circumference of the upper support surface 29 and the lower support surface 31.

The upper receiving surface 45 and the lower receiving surface 46, which respectively support the upper support surface 29 and the lower support surface 31 of the rotating end 20 and constitute part of the ball joint structure, are formed on the upper holding portion 43 and the lower holding portion 44 (see FIG. 13). The upper receiving surface 45 and the lower receiving surface 46 are shaped as spherical surfaces that conform to the upper support surface 29 and the lower support surface 31, and come into spherical surface contact with the upper support surface 29 and the lower support surface 31 of the rotating end 20.

The upper receiving surface 45 is a curved surface that is smoothly curved such that the diameter dimension gradually increases while extending downward from the upper end, and the lower receiving surface 46 is a curved surface that is smoothly curved such that the diameter dimension gradually increases while extending upward from the lower end. The upper receiving surface 45 and the lower receiving surface 46 both extend in a continuous manner over the entire circumference of the upper holding portion 43 and the lower holding portion 44.

An electrical wire passage portion 47, through which the electrical wires 11 extending from the rotating end 20 are drawn out to the outside of the bracket 40, is formed as an opening in a central portion of the upper receiving surface 45. The electrical wire passage portion 47 is tube-shaped and extends upward from a central portion of the upper holding portion 43, and is open at the upper end of the bracket 40. When the rotating end 20 is being held in the rotating end holding portion 42, the electrical wire insertion hole 25 of the rotating end 20 and the electrical wire passage portion 47 are in communication with each other in the vertical direction (see FIG. 13).

A lower end portion of the electrical wire passage portion 47 constitutes a restriction receiving portion 48 against which the restriction wall portion 27 of the rotating end 20 can abut so as to prevent an excessively inclined orientation of the rotating end 20. The restriction receiving portion 48 is the inner circumferential surface of the electrical wire passage portion 47, is a surface that is steep in the vertical direction (approximately vertical), and extends in a continuous manner over the entire circumference of the electrical wire passage portion 47. The restriction receiving portion 48 forms a fully-closed circular shape in a plan view, and conforms to the shape of the restriction wall portion 27 (see FIG. 3). The restriction receiving portion 48 is connected to the upper end of the upper receiving surface 45. Note that a taper portion 49, in which the width dimension of the electrical wire passage portion 47 decreases, is provided on the upper side of the restriction receiving portion 48 in the electrical wire passage portion 47.

As shown in FIG. 13, the fitting hole portion 51, into which the fitting protrusion portion 28 of the rotating end 20 can be fitted, is provided in a central portion of the lower receiving surface 46. The fitting hole portion 51 is a hole that penetrates in the vertical direction, and the cross-sectional shape is a fully-closed circle shape. The fitting hole portion 51 is formed such that the hole diameter increases downward, and a sufficient clearance with the fitting protrusion portion 28 is ensured. Accordingly, the fitting protrusion portion 28 of the rotating end 20 is fitted into the fitting hole portion 51 so as to be capable of pivoting and inclining therein.

The bracket 40 has a semi-divided structure including a first member 40F and a second member 40S that can be combined in the horizontal direction. When the first member 40F and the second member 40S have been separated, the rotating end holding portion 42 and the electrical wire passage portion 47 are open in the horizontal direction.

A plurality of fixing flange portions 41 are provided on the first member 40F. The portion of the first member 40F that is between the upper holding portion 43 and the lower holding portion 44 is an opening portion 52 that exposes the rotating end 20 to the outside when being held in the bracket 40.

Figure 12:
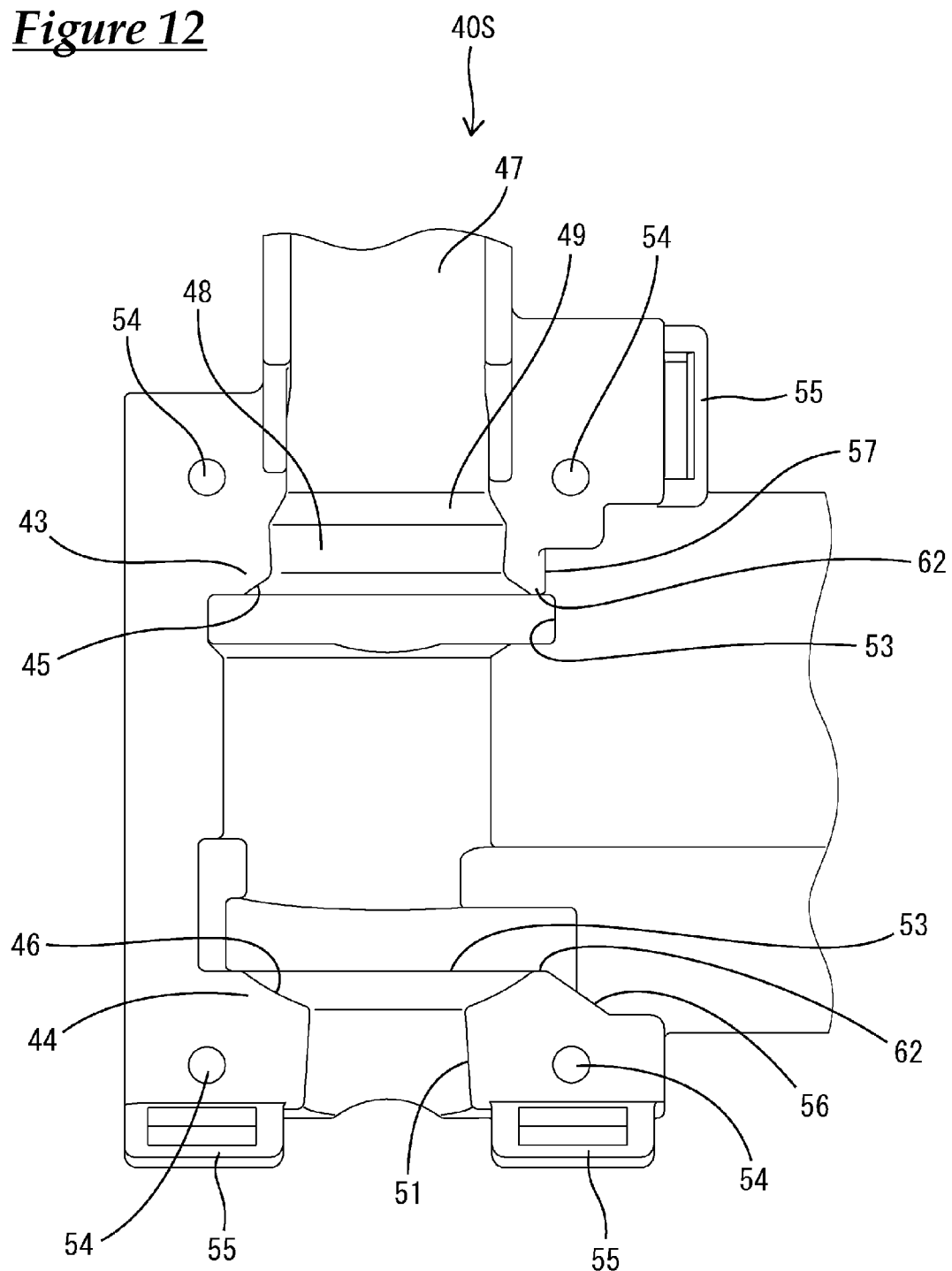
FIG. 12 is a partial cutaway front view of a rotating end holding portion of a second member of the bracket.

As shown in FIG. 12, the second member 40S is provided with fitting grooves 53 into which the upper flange portion 32 and the lower flange portion 34 of the rotating end 20 are fitted. The fitting grooves 53 are long and narrow grooves that extend in the horizontal direction and penetrate the second member 40S in the inward-outward direction. The fitting grooves 53 are provided at locations in the second member 40S that are respectively below the upper support surface 29 and above the lower support surface 31.

The first member 40F and the second member 40S are positioned by positioning means 54 that are provided at a plurality of locations, and are held so as to be integrally connected by connection means 55 that are provided at a plurality of locations. The positioning means 54 are provided at the four corners of the rotating end holding portion 42 for example, and the connection means 55 are provided at any locations, such as on the upper and lower sides of the rotating end holding portion 42 and the left and right sides of the electrical wire passage portion 47.

The bracket 40 and the rotating end 20 are provided with the angle restriction edges that restrict the angle of the rotating end 20 by abutting against opposing members when the rotating end 20 becomes inclined at a predetermined angle (hereinafter, the angle restriction edges provided on the rotating end 20 being referred to as rotating end edges 61, and the angle restriction edges provided on the bracket 40 being referred to as bracket edges 62). The rotating end edges 61 and the bracket edges 62 abut against opposing members on the upper and lower sides of the rotating end 20 when the rotating end 20 becomes inclined at a predetermined angle. Also, the rotating end edges 61 and the bracket edges 62 abut against opposing members on two sides (connection portion 22 side and the side opposite thereto) of the electrical wire insertion hole 25 and the fitting protrusion portion 28 when the rotating end 20 becomes inclined at a predetermined angle.

Included among the rotating end edges 61 are a first rotating end edge 61F that abuts against an opposing member if downward force acts on the electrical wire guide 12 and the rotating end 20 becomes inclined downward (the connection portion 22 becomes displaced downward), and a second rotating end edge 61S that abuts against an opposing member if upward force acts on the electrical wire guide 12 and the rotating end 20 becomes inclined upward (the connection portion 22 becomes displaced upward).

Figure 15:
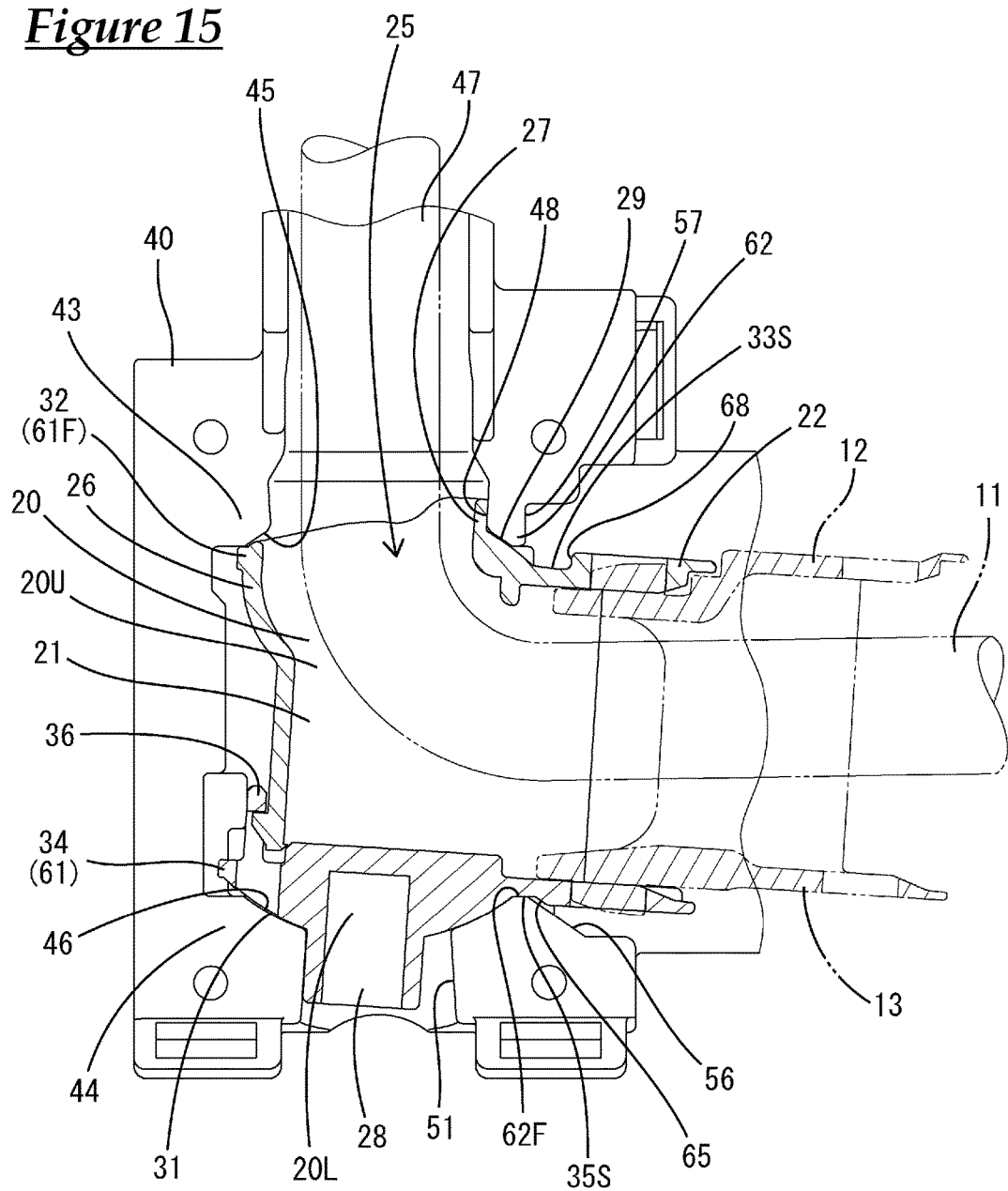
FIG. 15 is a cross-sectional view of a state in which the rotating end is inclined downward.

As shown in FIG. 15, the first rotating end edge 61F is constituted by the upper flange portion 32 of the rotating end 20. The first rotating end edge 61F abuts against the lower surface of the upper holding portion 43 (an approximately horizontal surface that is connected to the outer circumferential side of the lower end of the upper receiving surface 45).

Figure 14:
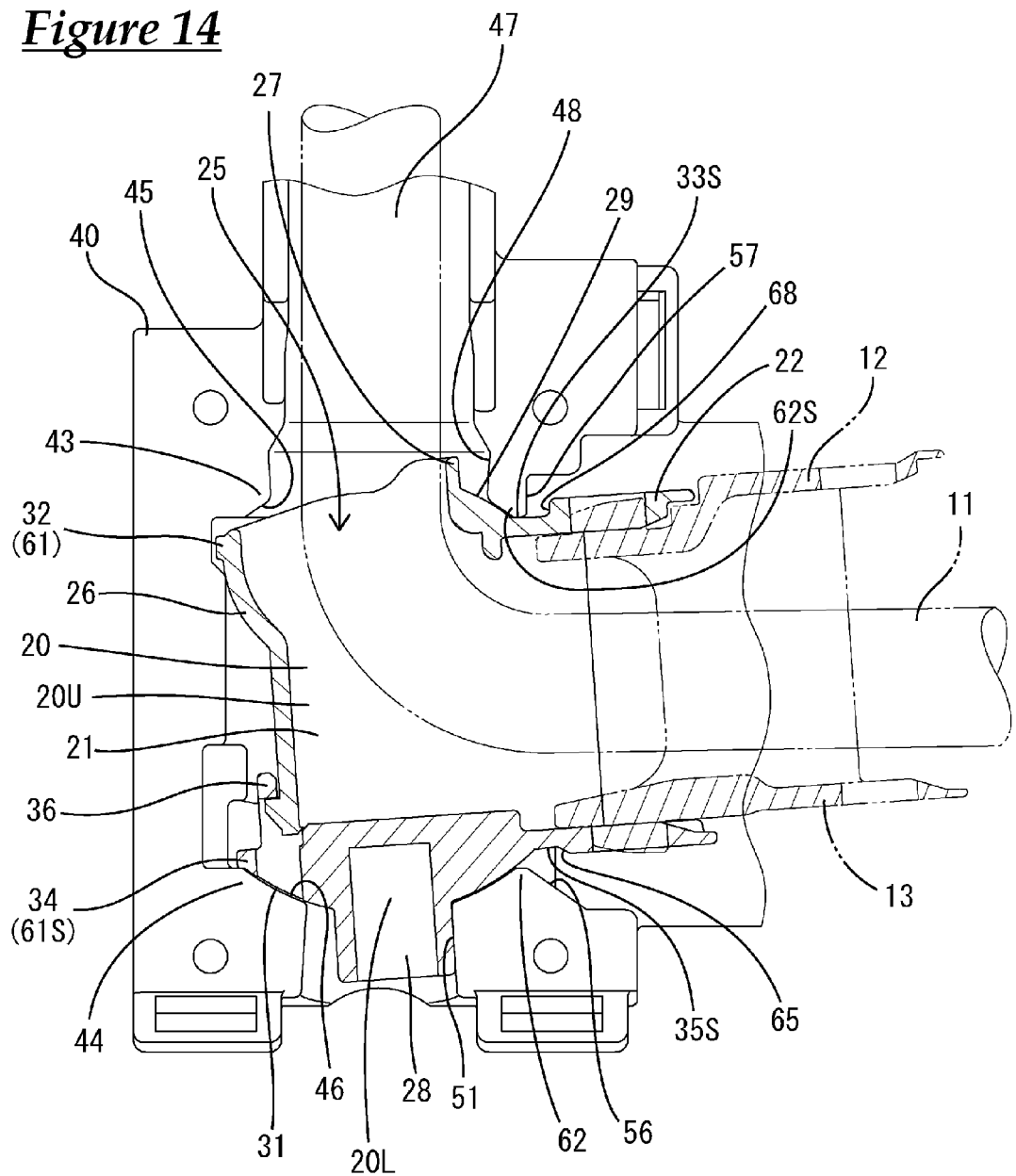
FIG. 14 is a cross-sectional view of a state in which the rotating end is inclined upward.

As shown in FIG. 14, the second rotating end edge 61S is constituted by the lower flange portion 34 of the rotating end 20. The second rotating end edge 61S abuts against the upper surface of the lower holding portion 44 (an approximately horizontal surface that spreads circumferential outward and is connected to the upper end of the lower receiving surface 46).

Included among the bracket edges 62 are a first bracket edge 62F that abuts against an opposing member if downward force acts on the electrical wire guide 12 and the rotating end 20 becomes inclined downward (the connection portion 22 becomes displaced downward), and a second bracket edge 62S that abuts against an opposing member if upward force acts on the electrical wire guide 12 and the rotating end 20 becomes inclined upward (the connection portion 22 becomes displaced upward).

As shown in FIG. 15, the first bracket edge 62F is constituted by an upper end portion of the lower holding portion 44 (a portion having a tapered shaped between the lower receiving surface 46 and a lower-side outer circumferential surface 56 formed so as to surround the outer circumferential side of the lower receiving surface 46). The lower-side outer circumferential surface 56 is inclined so as to gradually rise while extending inward (toward the lower receiving surface 46) in the diameter direction. The first bracket edge 62F abuts against the bottom surface 35S of the lower groove portion 35. The outer circumferential edge of the lower groove portion 35 (portion having a level difference from the connection piece 23) is an auxiliary edge 65, and even if the first bracket edge 62F were to slide over the bottom surface 35S of the lower groove portion 35, the auxiliary edge 65 can abut against the first bracket edge 62F and reliably stop further sliding.

As shown in FIG. 14, the second bracket edge 62S is constituted by a lower end portion of the upper holding portion 43 (a portion having a tapered shaped between the upper receiving surface 45 and an upper-side outer circumferential surface 57 formed so as to surround the outer circumferential side of the upper receiving surface 45). The upper-side outer circumferential surface 57 is an approximately vertical surface. The second bracket edge 62S abuts against the bottom surface 33S of the upper groove portion 33. The outer circumferential edge of the upper groove portion 33 (portion having a level difference from the connection piece 23) is an auxiliary edge 68, and even if the second bracket edge 62S were to slide over the bottom surface 33S of the upper groove portion 33, the auxiliary edge 68 can abut against the second bracket edge 62S and reliably stop further sliding.

The following describes an example of operations for assembling the electrical wire guiding apparatus of the present embodiment and attachment to a vehicle. First, a bundle of electrical wires 11 is inserted into the electrical wire guide 12, and the rotating end 20 is connected to an end portion of the electrical wire guide 12. The bundle of electrical wires 11 passing through the electrical wire guide 12 is inserted into the electrical wire insertion hole 25 of the upper-side member 20U, the lower-side member 20S is combined with the upper-side member 20U, and then the connection portion 22 of the rotating end 20 is connected to a link body 13.

Next, the rotating end 20 is placed in the bracket 40. The upper flange portion 32 and the lower flange portion 34 of the rotating end 20 are fitted into the fitting grooves 53 of the second member 40S, and the rotating end 20 is sandwiched between the first member 40F and the second member 40S, which are in the separated state, such that the opening portion 52 of the first member 40F is located at the rotating end 20. The first member 40F and the second member 40S are positioned by the positioning means 54 and connected together by the connection means 55, and thus the rotating end 20 is held in the rotating end holding portion 42 of the bracket 40.

Next, the electrical wire guiding apparatus is attached to the vehicle. When the fixing flange portion 41 of the bracket 40 is fixed to the sliding door D, the lower support surface 31 of the rotating end 20 is placed on and supported to the lower receiving surface 46, and the upper support surface 29 of the rotating end 20 is in contact with the upper receiving surface 45 as shown in FIG. 13.

At this time, the orientation of the rotating end 20 may become inclined upward or downward due to influences such as gravity or reaction force from the electrical wires 11. If the rotating end 20 enters an upward inclined orientation as shown in FIG. 14, the second bracket edge 62S abuts against the bottom surface 33S of the upper groove portion 33 of the rotating end 20, and the second rotating end edge 61S abuts against the upper surface of the lower holding portion 44, thus reliably stopping sliding at two upper and lower points on the rotating end 20 and defining the angle. The second bracket edge 62S abuts against the upper groove portion 33 over the entirety thereof in the lengthwise direction (circumferential direction of the rotating end 20), and the entirety of the second rotating end edge 61S in the lengthwise direction (circumferential direction of the rotating end 20) abuts against the upper surface of the lower holding portion 44, thus preventing inclination of the rotating end 20 in the transverse direction (direction orthogonal to the extending direction of the electrical wire guide 12).

Also, if the rotating end 20 enters a downward inclined orientation as shown in FIG. 15, the first bracket edge 62F abuts against the bottom surface 35S of the lower groove portion 35 of the rotating end 20, and the first rotating end edge 61F abuts against the lower surface of the upper holding portion 43, thus reliably stopping sliding at two upper and lower points on the rotating end 20 and defining the angle. The first bracket edge 62F abuts against the lower groove portion 35 over the entirety thereof in the lengthwise direction (circumferential direction of the rotating end 20), and the entirety of the first rotating end edge 61F in the lengthwise direction (circumferential direction of the rotating end 20) abuts against the lower surface of the upper holding portion 43, thus preventing inclination of the rotating end 20 in the transverse direction (direction orthogonal to the extending direction of the electrical wire guide 12). Also, the restriction wall portion 27 of the rotating end 20 abuts against the restriction receiving portion 48 of the bracket 40, thus preventing the rotating end 20 from falling out.

The following describes actions and effects of the embodiment having the configuration described above.

The electrical wire guiding apparatus of the present embodiment includes the bracket 40 that is to be fixed to the sliding door D, and the rotating end 20 that is arranged at an end portion of the electrical wire guide 12 and is held in the bracket 40 in a manner of being able to rotate in any direction, the electrical wire guide 12 surrounding the electrical wires 11 and being capable of bending in a predetermined shape, wherein the bracket 40 and the rotating end 20 are provided with the rotating end edges 61 and the bracket edges 62 that restrict the angle of the rotating end 20 by abutting against opposing members when the rotating end 20 becomes inclined at a predetermined angle. According to this configuration, sliding of the rotating end 20 is restricted, thus making it possible to define the inclination angle of the rotating end 20.

Also, the rotating end edges 61 and the bracket edges 62 abut against opposing members on at least the upper and lower sides of the rotating end 20 when the rotating end 20 becomes inclined at a predetermined angle. According to this configuration, the inclination angle of the rotating end 20 can be more reliably defined.

Also, the members that abut against the bracket edges 62 are the upper groove portion 33 and the lower groove portion 35 that are shaped as grooves. According to this configuration, edges (auxiliary edges 65, 68) of the upper groove portion 33 and the lower groove portion 35 engage with the bracket edges 62, thus making it possible to more reliably define the inclination angle of the rotating end 20.

OTHER EMBODIMENTS

The present invention is not limited to the embodiment described above using the foregoing description and drawings, and embodiments such as the following are also encompassed in the technical scope of the present invention.

Although the bracket edges 62 abut against the bottom surface 33S of the upper groove portion 33 of the rotating end 20 or the bottom surface 35S of the lower groove portion 35 in the above embodiment, there is no limitation to this, and the bracket edges may abut against a portion of the rotating end that has any shape instead of a portion that is shaped as a groove.

Although the case of applying the present invention to an end portion structure of the sliding door D is described in the above embodiment, there is no limitation to this, and the present invention can be applied to an end portion structure of the body.

Although the case of applying the present invention to an electrical wire guiding apparatus that guides the bending movement of the wire harness 10 for a sliding door is described in the above embodiment, the present invention can be applied to an electrical wire guide that guides the bending movement of various types of wire harnesses that can bend in a predetermined shape (e.g., a wire harness for connection to a sliding seat).

Although the rotating end edges 61 and the bracket edges 62 abut against opposing members on the upper and lower sides of the rotating end 20 in the above embodiment, there is no limitation to this, and the rotating end edges and the bracket edges may abut against only either the upper side or the lower side of the rotating end.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

D Sliding door (mounting portion)
11 Electrical wire
12 Electrical wire guide
20 Rotating end
40 Bracket
61 Rotating end edge (angle restriction edge)
62 Bracket edge (angle restriction edge)

The invention claimed is:

1. An electrical wire guiding apparatus comprising:
a bracket that is to be fixed to a mounting portion;
a rotating end that is arranged at an end portion of an electrical wire guide and is held in the bracket in a manner of being able to rotate in any direction, the electrical wire guide surrounding an electrical wire and being able to bend; and
an angle restriction edge that is provided on one of the bracket or the rotating end and that restricts inclination of the rotating end in a transverse direction to the electrical wire guide by abutting against an opposing member of the other of the bracket or the rotating end so that the rotating end is restricted from being inclined at an angle that is greater than a predetermined angle.

2. The electrical wire guiding apparatus according to claim 1, wherein the angle restriction edge abuts against the opposing member on at least upper and lower sides of the rotating end when the rotating end becomes inclined at the predetermined angle.

3. The electrical wire guiding apparatus according to claim 1, wherein the opposing member is shaped as a groove.

* * * * *